United States Patent [19]

Sanders et al.

[11] 4,182,414

[45] Jan. 8, 1980

[54] WATER SCREEN

[76] Inventors: Larry D. Sanders, 114 E. Limit St., Madisonville, Tex. 77864; Marvin E. Gilbert, Rte. 2, Box 609, Cleveland, Tex. 77327

[21] Appl. No.: 824,238

[22] Filed: Aug. 12, 1977

Related U.S. Application Data

[63] Continuation-in-part of Ser. No. 734,280, Oct. 20, 1976, abandoned.

[51] Int. Cl.² .............................................. E21B 43/08
[52] U.S. Cl. ........................................ 166/74; 90/15; 138/DIG. 9; 166/227; 210/497 R
[58] Field of Search ................... 90/15; 210/169, 459, 210/460, 484, 497, 497.1, 498, 163; 166/227, 74; 138/DIG. 9

[56] References Cited

U.S. PATENT DOCUMENTS

| 1,652,650 | 12/1927 | Watson et al. | 166/227 |
| 3,177,945 | 4/1965 | Lether | 210/498 |
| 3,545,336 | 12/1970 | Savko | 90/15 |
| 3,547,162 | 12/1970 | Schaerer | 138/DIG. 9 |
| 3,864,182 | 2/1975 | Shobert et al. | 210/497.1 |

OTHER PUBLICATIONS

Brochure 12/31/76—L. B. Foster Company, "Perforated Water Well Casing", 2000 West Loop South, Houston, Texas.

Primary Examiner—Theodore A. Granger
Attorney, Agent, or Firm—Arnold, White & Durkee

[57] ABSTRACT

A water screen displaying a variable filtration feature is provided wherein the water screen comprises a pipe length made of a compressible plastic material. The pipe length is provided with a plurality of inlet openings thereby permitting fluid located peripheral to the exterior surface of the pipe length to be transported through the inlet openings and at the same time filtering particulate matter and debris from the water.

2 Claims, 4 Drawing Figures

WATER SCREEN

CROSS REFERENCE TO RELATED APPLICATION

This application is a continuation-in-part of application Ser. No. 734,280, filed on Oct. 20, 1976, and now abandoned and entitled "Gilsan Plastic Variable Water Well Screen".

BACKGROUND OF THE INVENTION

The present invention relates generally to a water screen and particularly to a water screen providing a variable filtration function.

In general, prior to the present invention, water screens have been complicated in nature and have required a great expense of time and money in their manufacture. For example, the L. B. Foster Company, 415 Holiday Drive, Pittsburgh, Pa. 15220 has recently announced, in an advertising brochure, the development of special tooling for cutting slots in well casing for use as water well screens. Additionally, previous water screens do not readily provide for variable filtration. That is, previous water screens are capable of filtering certain size particles from the water as the water flows through the screen, however, in instances wherein the particulate size is less than screen openings, these particles traveled unhindered through the screen and hence remain as contaminants in the water. Thus, in order to filter substantially all sizes of particulate matter, it has often been necessary to utilize additional filtration systems that increase the time and expense necessary to provide filtered water.

SUMMARY OF THE INVENTION

Briefly, in accordance with this invention, these and other problems are alleviated by providing an inexpensive water screen formed from a compressible plastic material and displaying a variable filtration feature.

The water screen comprises a length of pipe capped at one end and communicable at the other end thereof with a source of negative pressure. The pipe length is made from a plastic, resilient material suitable for liquid transport. The pipe length is provided with at least one inlet opening which comprises a slot with the longitudinal axis of the slot arranged parallel to the longitudinal axis of the pipe length and inclined at an angle of at least 1° such that with the source of negative pressure providing suction, the material of the pipe length radially compresses thereby reducing the circumferential distance between the walls of the slot hence permitting the flow of water therethrough but excluding debris.

In a further aspect of the present invention, the angle of inclination is defined by the angle between a plane passing through the longitudinal axis of the pipe length and bisecting the circumferential distance existing between the walls of the slot as measured along the outer surface of the pipe length and a radius of the pipe length extending from the center of the pipe length and intersecting the bisecting plane at a point tangential to the surface of the pipe length.

In another aspect of the present invention, the plastic material from which the water screen is made is chosen from the group comprising polyvinylchloride, polypropylene and polyethylene.

In yet a further aspect of the present invention the slot has parallel side walls.

In another aspect of the invention, the center-to-center circumferential distance between the slots is not less than 0.25.

In another aspect of the invention, the parallel side walls of the slots are separated by a distance of not less than 0.016 inch.

In yet a further aspect of the present invention, the angle of inclination as measured between the bisecting plane and a radius of the pipe length lies in the range of 1° to 25°.

BRIEF DESCRIPTION OF THE FIGURES

The description of the preferred embodiment of the present invention is more particularly described in reference to the following figures.

DESCRIPTION OF THE PREFERRED EMBODIMENT

Figure 1:
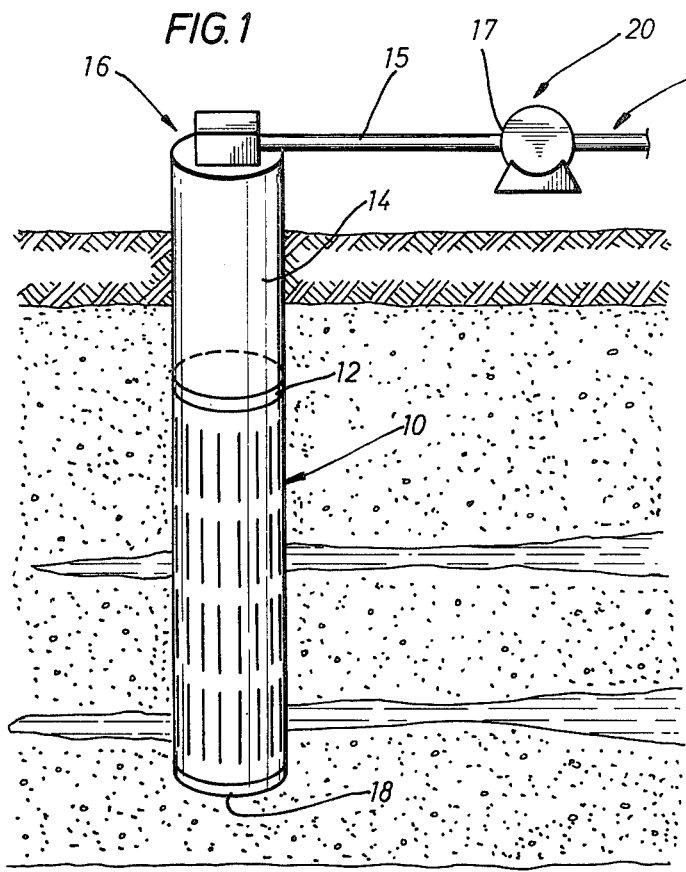
FIG. 1 shows the water screen of the present invention in conjunction with a water well.

Referring now to the drawings, and first to FIG. 1, the present invention is generally illustrated as associated with a water well. In FIG. 1, a water screen 10 is attached at an attachment 12 to a typical water well pipe conduit 14. An outlet end 16 of the pipe conduit 14 is in communication by, for example, a pipe 15, to an inlet 17 of a source of negative pressure such as, for example, a pump 20. The water screen 10 is provided with an end cap 18 to prevent water or any undesirable material from being drawn into the water screen 10 through the lowermost end thereof whenever the pump 20 is operating. The end cap 18 may be attached to the water screen 10 in any well-known manner. For example, the lowermost end of the water screen 10 may be threadedly attached to the end cap 18 or may be attached by one or more clamps.

As shown in FIG. 1, the water screen 10 and a part of the pipe conduit 14 extend into a water table. Of course, the water screen 10 need not be fully extended into the water table as depicted in FIG. 1. Accordingly, the water screen 10 need only be extended into the water table such that one or more slot groups, as hereinafter defined, are positioned in the water table. The water table may be an above-ground or underground reservoir such as a stream, lake, pond or the like or may be a water sand table. Throughout the remaining description of the present invention the term "water sand table" is meant to include any water table which has existing therein particulate material such as sand, gravel, mineral particles or any other undissolved material of whatever nature. Thus, an above-ground stream with particulate matter flowing therein is a "water sand table" as is an underground reservoir containing particulate matter suspended within the water. As will be apparent hereinafter, the exact nature of the water sand table is of no bearing to the present invention.

Figure 2:
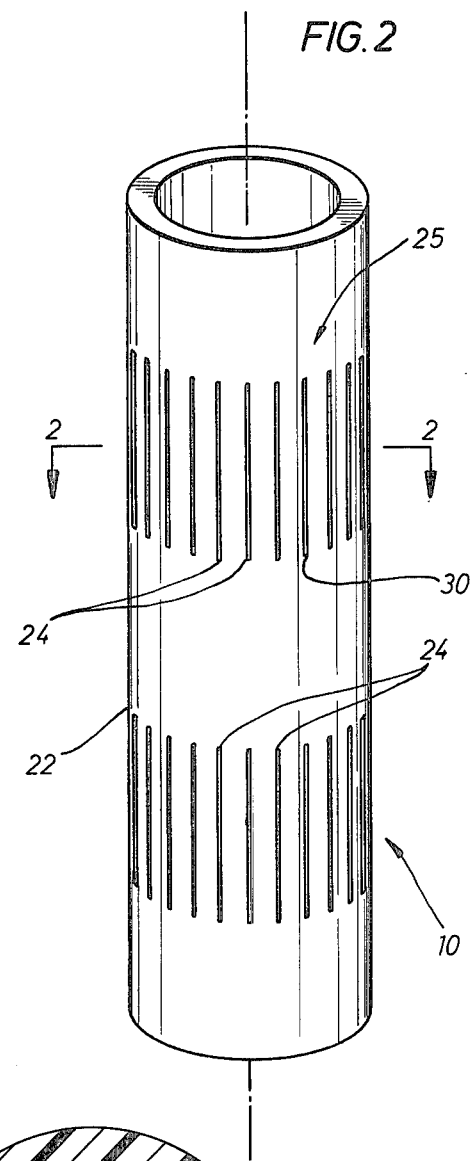
FIG. 2 is a perspective view of the water screen of the present invention.

Referring now to FIG. 2, the water screen 10 of the present invention is illustrated. Generally, the water screen 10 comprises a hollow, tubular pipe length 22 with a plurality of slots 24 circumferentially distributed over the surface of and extending through the wall of the pipe length 22. The longitudinal axis of each slot is parallel to the longitudinal axis of the pipe length 22. As depicted in FIG. 2, the plurality of circumferentially distributed slots 24 describe a circumferential slot group 25. As further depicted in FIG. 2, there may exist in any given length of the pipe length 22 a plurality of circumferential slot groups 25. Each pipe length 22 may also be adaptable to be attached in an end-to-end relation to form an operating string of pipe lengths 22.

The pipe length 22 is made of a compressible plastic material, capable of withstanding pressure forces directed radially to the pipe length 22 without adverse effect, however, having sufficient resiliency to permit an area in which the slot group 25 is disposed to be radially compressible. The plastic material preferred in the present invention should display characteristics of compressibility and resiliency such that the pipe length 22 may be radially compressed and expanded without weakening due to fatigue. For example, pipe lengths 22 made from plastic materials such as polyvinylchloride, polyethylene and polypropylene display acceptable characteristics.

Referring again to FIG. 2, it is noted that there are two slot groups 25 disposed in the depicted pipe length 22. It has been discovered that it is possible to place a number of such slot groups in a predetermined axial length of the pipe length 22 consistent with the pressure load factors of the compressible plastic material comprising the pipe length 22. Of course, as one skilled in the art will readily appreciate, the number of slots in each slot group and the number of slot groups per axial length of the pipe length 22 is dependent upon the inherent strength of the compressible plastic material used in the manufacture of the water screen 10.

In operation the slots 24 provide a variable filtration feature. Accordingly, when the pump 20 (FIG. 1) is operating, water or other fluid materials, existing within the surrounding water sand table in which the water screen 10 is positioned flow toward the water screen 10 either by action of the pump or the natural flow of the water or other fluids. In instances in which the water table has no particulates, the suction generated by pump 20 draws water through the slots 24 and into the water screen 10 substantially unhindered, i.e., the pump suction is less than is required to cause the compressible plastic material of the water screen to compress. Thereafter, the water is drawn through pipe conduit 14 by the well-known action of the pump 20 and released through a pump outlet line 26 (FIG. 1). In this situation, filtration occurs by virtue of the width of each of the slots 24.

On the other hand, when the water screen 10 is positioned in a water sand table the particulate matter contained therein will be drawn toward the slots 24 along with the water or other fluid. In this instance, and as one skilled in the art will readily appreciate, the suction necessary to draw water to the water screen 10 is somewhat higher than is required for a particulate-free water table. With the pump 20 thusly providing a greater suction, each length of the pipe containing the slot groups 25 tends to radially compress, due to the compressible nature of the pipe length 22, and correspondingly, the sides of the slots 24 are drawn closer together. Thus, as the sides of the slots 24 are drawn closer together variable filtration action takes place thereby permitting the water to flow through the narrowed slots whereas the particulate matter is not drawn through the slots. Accordingly, the water screen 10 of the present invention provides a variable filtration dependent upon the suction drawn by the pump 20 and the amount and size of particulate matter existing within the water sand table. Of course, whenever the pump 20 ceases operation the suction communicated by the pump 20 on the pipe length 22 also ceases. Accordingly, the resiliency of the plastic material comprising the pipe length 22 causes each pipe length 22 containing the slot groups 25 to substantially return to the configuration existing prior to the initiation of suction.

The variable filtration feature of the present invention occurs due to the compressible nature of the pipe length 22 in the area of the slot group 25 and the relative position of each slot with respect to the longitudinal axis of the pipe length 22.

Figure 3:
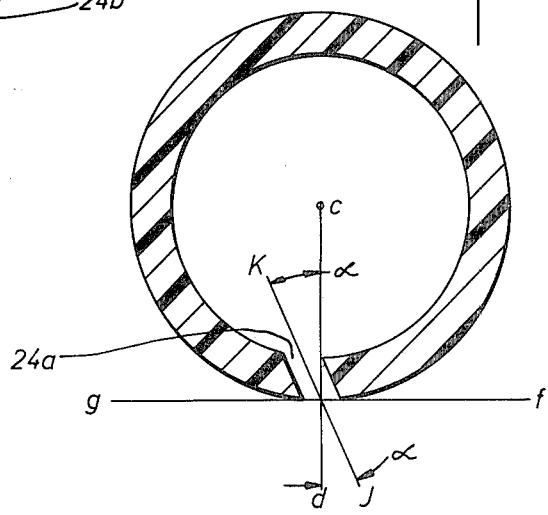
FIG. 3 depicts a cross section of FIG. 2 taken along the line 2—2 showing the geometric relation of a slot.

Referring now to FIG. 3, which is a cross section of FIG. 2 taken along the line 2—2, a slot 24a is shown (the remaining slots are omitted). The above-described variable filtration feature of the present invention is described with reference to the slot 24a. The slot 24a is arranged such that a plane longitudinally bisecting the slot 24a is positioned angularly with respect to a radius of the pipe length 22 extending from the center of the cross-section and intersecting the plane bisecting the slot 24a at the outer wall of the cross section of the pipe length 22.

In FIG. 3, the line c–d includes a radius of the cross section of the pipe length 22. The line f–g represents a line drawn tangential to the cross section of pipe length 22 and intersecting the radius line at the outermost surface of the pipe length 22. Line j–k, which contains the bisecting plane, passes through the cross section of the pipe length 22 at the intersection of the c–d radius and the f–g tangential line and bisects the slot 24a. The angle $a$, which represents the angle between the line j–k and the radius c–d establishes the angle between the plane longitudinally bisecting the slot 24a and its associated radius and defines an angle of inclination.

The positioning of the plurality slots 24 (FIG. 2) in the pipe length 22 is a critical feature of the present invention. The slots are positioned to afford both maximum efficiency in the pumping operation and maximum filtration of particulate matter. In this regard, as previously described, the slots 24 in each slot group 25 are arranged such that their longitudinal axes are parallel to the longitudinal axis of the pipe length 22 with the slots being positioned at substantially equivalent angles of inclination. Furthermore, the width of each slot and the spacing between each slot is dependent upon such physical parameters of the compressible plastic material as the pressure load factor of the compressible plastic material which comprises the pipe length 22. Accordingly, it is necessary to provide a sufficient number of slots to maximize filtration efficiency without providing so many slots as to severly threaten the structural integrity of the pipe length 22 in the region of each slot group. Through experimentation, it has been determined that a center-to-center distance between adjacent slots of not less than approximately 0.250 inches will permit a sufficient number of slots to be formed in a given circumference of the pipe length 22 while keeping structural integrity necessary to the use of the water screen 10 whenever the pipe length 22 is constructed from 40 to 80 gauge polyvinylchoride pipe with a wall thickness of from 0.156 to 0.60 inches and a radius of from 2 to 12 inches. Of course, one skilled in the art will readily appreciate that the wall thickness for any given diameter of the pipe length 22 must not be so great as to render the pipe length noncompressible thereby negating the variable filtration feature of the present invention.

Figure 4:
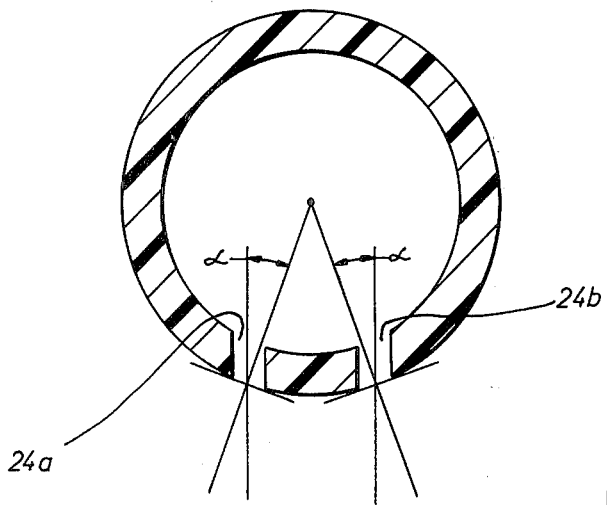
FIG. 4 is a cross section of FIG. 2 along the line 2—2 showing a plurality of circumferentially distributed slots.

The slots 24 may be made in the pipe length 22 by any well-known method. For example, the slots 24 may be individually cut in the pipe length 22 by using a circular saw blade. The saw blade may be extended into the pipe length 22 until the length of the slot 24 is equal to the diameter of the saw blade and, in this instance, ends 30 of each of the slots 24 are substantially perpendicular to the longitudinal axis of the pipe length 22. Alternatively, the cutting action of the saw blade may be stopped before the saw blade reaches its diameter and, in this instance, the ends 30 of the slots 24 subscribe an arc whose radius is the radius of the saw blade used in the cutting operation. Also, the slots may be cut one at a time, in pairs or in groups, by cutting implements that are positioned to cut the slots at the appropriate angle of inclination. For example, the slots depicted in FIG. 4 are made by using a pair of parallel spaced saw blades. In this instance the angle of inclination for one slot, i.e., slot 24a, is equal to the angle of inclination of the adjacent parallel slot, i.e., slot 24b. However, the angle of inclination of slot 24b, due to the well-known geometric relation obtained by passing parallel lines through a cylinder, lies on the opposite side of the plane bisecting the slot 24b when compared to the angle of inclination of slot 24a.

As depicted in FIG. 3 the side walls of the slot 24a are in parallel relation. In an alternative embodiment of the present invention the side walls may be tapered either inwardly or outwardly without adversely influencing the variable filtration feature of the present invention.

As one skilled in the art will appreciate, the width of each slot 24 depends upon the size of the particulate matter existing within the water sand table to be filtered, the compressible nature of the material comprising the pipe length 22 and the number of slots existing within each slot group 25. In the present invention, a width of each slot 24, as measured along the circumference of the outer wall of the pipe length 22 of not less than 0.016 inch is preferred in instances wherein the pipe section 22 is constructed from 40 to 80 gauge polyvinylchloride pipe with a wall thickness of from approximately 0.156 to approximately 0.60 inch. It should be noted however, that the width of the slots 24 may be greater than or less than this preferred width according to the above-mentioned factors and still fall within the scope and spirit of the instant invention.

The spatial relation between adjacent slots is generally defined by the equation:

$$S = \frac{360}{N} \frac{(\pi)}{180} (r)$$

Where S = the circumferential center-to-center distance between adjacent slots;
N = the number of slots per slot group; and
r = the radius of the pipe length measured to the outer wall of the pipe length. Furthermore, the angle of inclination is defined by the equation:

$$\alpha = 1/2 \frac{(360)}{N}$$

Thus, where it is desired to adapt a 4 inch inner-diameter pipe length with an outer diameter of 4.313 inch as a water screen and have adjacent slots placed at approximately 0.50 inches apart (center-to-center) the above formulae establish the following requirements:
S = 0.50
r = 2.156
N = 27
$\alpha$ = 6.667°

Of course, the S distance may vary in keeping within the spirit of the present invention, and in turn produces variations in the angle of inclination $\alpha$.

As one skilled in the art will appreciate, the maximum angle of inclination, $\alpha_{max}$ for any pipe length 22 is dependent upon the wall thickness and diameter of the pipe length 22 and is easily calculated from the following formula:

$$\text{Sin } \alpha_{max} = (r_{inner}/r_{outer})$$

Where $r_{inner}$ = the radius of the pipe length measured to the inner wall of the pipe length; and
$r_{outer}$ = the radius of the pipe length measured to the outer wall of the pipe length.

For example, for the 4 inch inner-diameter pipe length described immediately above, the $_{max}$ is:

$$\text{Sin } \alpha_{max} = (2.000/2.150)$$

$$\text{Sin } \alpha_{max} = 0.9276$$

$$\alpha_{max} = 68.07°$$

Table I provides examples of water screens that may be produced by the practice of the present invention. The water screens shown in Table I are, for example, produced from commercially available 40 gauge and 80 gauge polyvinylchloride pipes. Each pipe length has a wall thickness of approximately 0.156 inch. It should be realized that Table I represents examples of the water screen of the present invention and as such Table I is not meant to be limiting in nature. Accordingly, the water screen may have more or less slots per slot group or more or less slot groups per running foot of pipe length and still fall within the intent and spirit of the present invention.

TABLE I

EXAMPLES OF VARIOUS WATER SCREENS

| Inner Diameter (Inch) | Center-to-Center Distance Between Slots (Inch) | $\alpha°$ (See Fig. 3) | $\alpha_{max}°$ | Vertical Distance Between Slot Groups (Inch) | Slots per Running Foot |
|---|---|---|---|---|---|
| 2.0 | 0.454 | 11.25 | 59.88 | 1.212 | 64 |
| 2.5 | 0.491 | 10.00 | 62.75 | 1.212 | 72 |
| 3.0 | 0.473 | 8.18 | 64.93 | 1.212 | 88 |
| 4.0 | 0.423 | 5.62 | 68.07 | 1.212 | 128 |
| 6.0 | 0.496 | 4.50 | 71.68 | 1.212 | 160 |
| 10.0 | 0.506 | 2.81 | 75.87 | 1.212 | 256 |
| 12.0 | 0.509 | 2.37 | 77.07 | 1.212 | 304 |

What is claimed is:

1. In a system for withdrawing water from a subterranean water table wherein a source of negative pressure is interconnected with a water screen to draw water upwardly through the screen, the improvement of:
   (a) a length of plastic, resilient, compressible, tubular pipe with an end cap attached to the lower end of said pipe length, as oriented for placement in the ground, and with the other end thereof being interconnectable to said source of negative pressure, the wall of said length of pipe being of a thickness such that negative pressure from said source will create an inward compression of the wall, said pipe having an outer surface for placement in contact with soil and being internally free of any additional pipe such that the negative pressure source is applied to the inner pipe surface to effect the inward compression;
   (b) a plurality of liquid inlet slot openings in a slot grouping in the wall of said pipe length, with each slot having a longitudinal axis essentially parallel to the longitudinal axis of said pipe length and inclined at an angle with respect to a radius of said pipe length, the angle of inclination relative to a pipe radius being at least essentially 10°, with said angle being determined in relation to the wall thickness of said pipe length, the inner and outer diameter of said pipe length, the nature of the plastic, resilient material, the circumferential distance between adjacent slots and the width of each slot such that when negative pressure providing suction is created within said pipe length, the material of said pipe length compresses causing the circumferential distance between the walls of said slots to reduce thereby permitting the flow of water through said slots and into said pipe length, but excluding debris therefrom, such that the pipe provides variable filtration by variable compression which is dependent upon the negative pressure established internally of the pipe and based upon the size of the particulate matter surrounding the pipe, the slots in each slot group being spaced in a circumferential array with the number of slots in each array being selected to optimize filtration without severely and adversely affecting the structural integrity of the pipe, the slots being spaced from each other such that the slots' center-to-center distance is greater than about 0.25 inches.

2. The water screen of claim 1, wherein said pipe length plastic, resilient material is chosen from the group comprising polyvinylchloride, polyethylene and polypropylene.

* * * * *